United States Patent [19]
Donkers

[11] 4,000,568
[45] Jan. 4, 1977

[54] BUCKET DREDGER
[75] Inventor: Jacobus M. Donkers, Zaandam, Netherlands
[73] Assignee: N.V. Industrieele Handelscombinatie Holland, Rotterdam, Netherlands
[22] Filed: July 14, 1975
[21] Appl. No.: 595,432
[30] Foreign Application Priority Data
July 18, 1974 Netherlands .................... 7409757
[52] U.S. Cl. ............................. 37/69; 74/245 R; 74/251 C; 74/257; 198/701; 198/850; 37/83; 37/192 R
[51] Int. Cl.² ............................. E02F 3/14
[58] Field of Search ........ 37/69, 83, 86, 88, 192 R, 37/DIG. 16; 74/242.8, 242.11 P, 245 R, 245 LP, 246, 248, 249, 250 R, 250 S, 250 C, 254, 257, 258; 198/189, 208, 140, 151, 152; 83/830–834; 299/29, 82, 84

[56] References Cited
UNITED STATES PATENTS

| | | | |
|---|---|---|---|
| 1,424,441 | 8/1922 | Best | 74/254 |
| 2,134,222 | 10/1938 | Blanchard | 198/151 X |
| 2,551,821 | 5/1951 | Bengston | 74/242.8 X |
| 3,379,005 | 4/1968 | Jones | 74/258 X |
| 3,731,551 | 5/1973 | Nelson | 74/257 |

FOREIGN PATENTS OR APPLICATIONS

| | | | |
|---|---|---|---|
| 208,412 | 10/1955 | Australia | 74/245 R |
| 860,177 | 12/1952 | Germany | 74/257 |
| 1,193,321 | 1/1961 | Germany | 74/245 R |
| 729,866 | 5/1955 | United Kingdom | 198/713 |
| 1,022,085 | 3/1966 | United Kingdom | 74/258 |
| 860,177 | 12/1952 | Germany | 74/257 |

*Primary Examiner*—E. H. Eickholt
*Attorney, Agent, or Firm*—Young & Thompson

[57] ABSTRACT

A bucket dredger has a bucket chain guided over a rocker, the buckets being pivotally interconnected by links of a length shorter than the length of the frame member of the buckets. Each link has an elongated opening with rounded ends in which the pivot pins of the chain are received, the pins associated with each link being pressed apart by rotation of a threaded spindle relative to a threaded socket. The bucket frames have lubricating channels surrounding the pins and sealed against the links.

3 Claims, 4 Drawing Figures

Fig_2
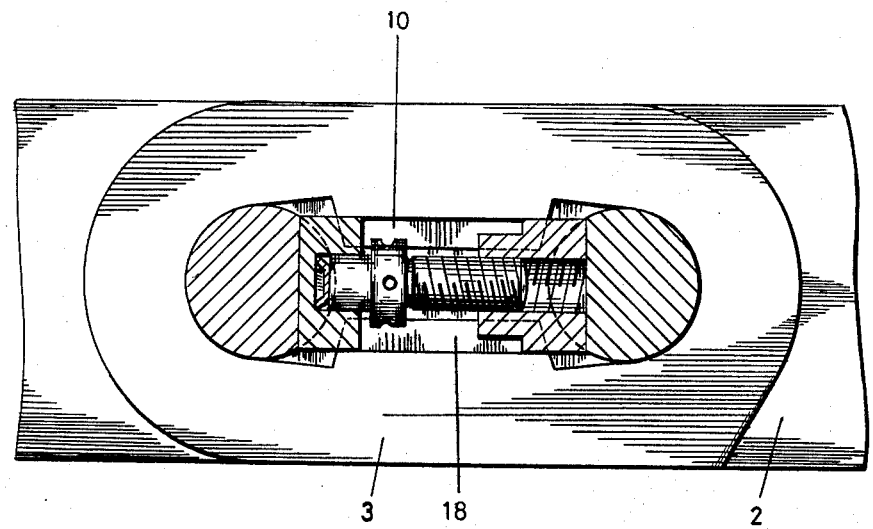
Fig_3
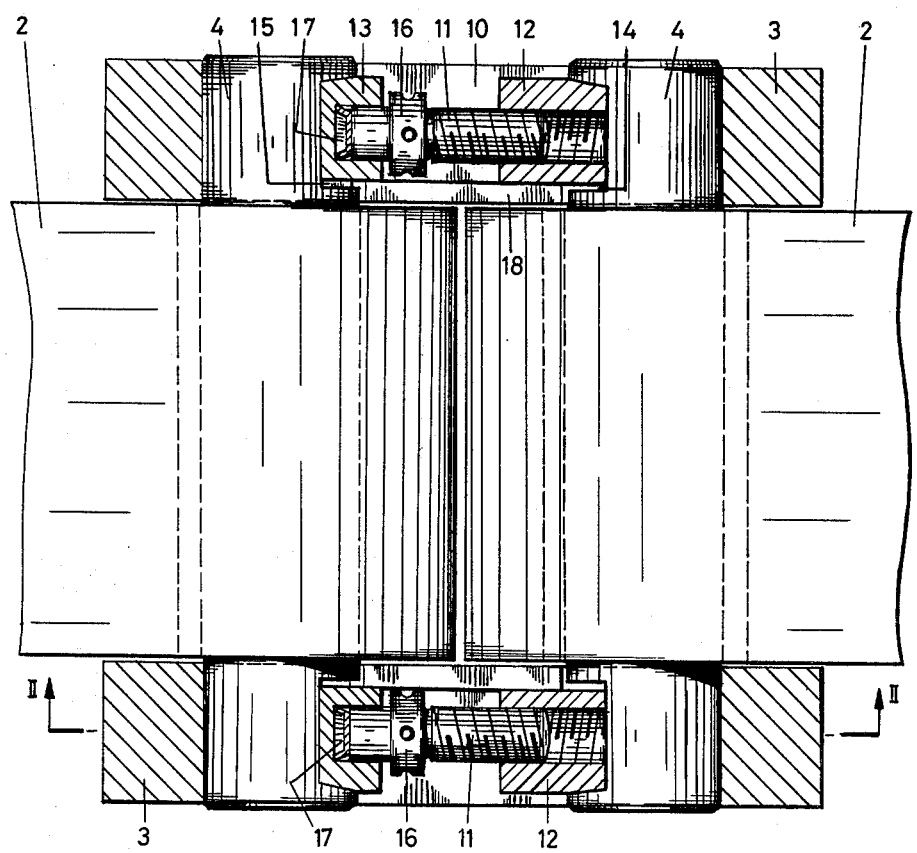

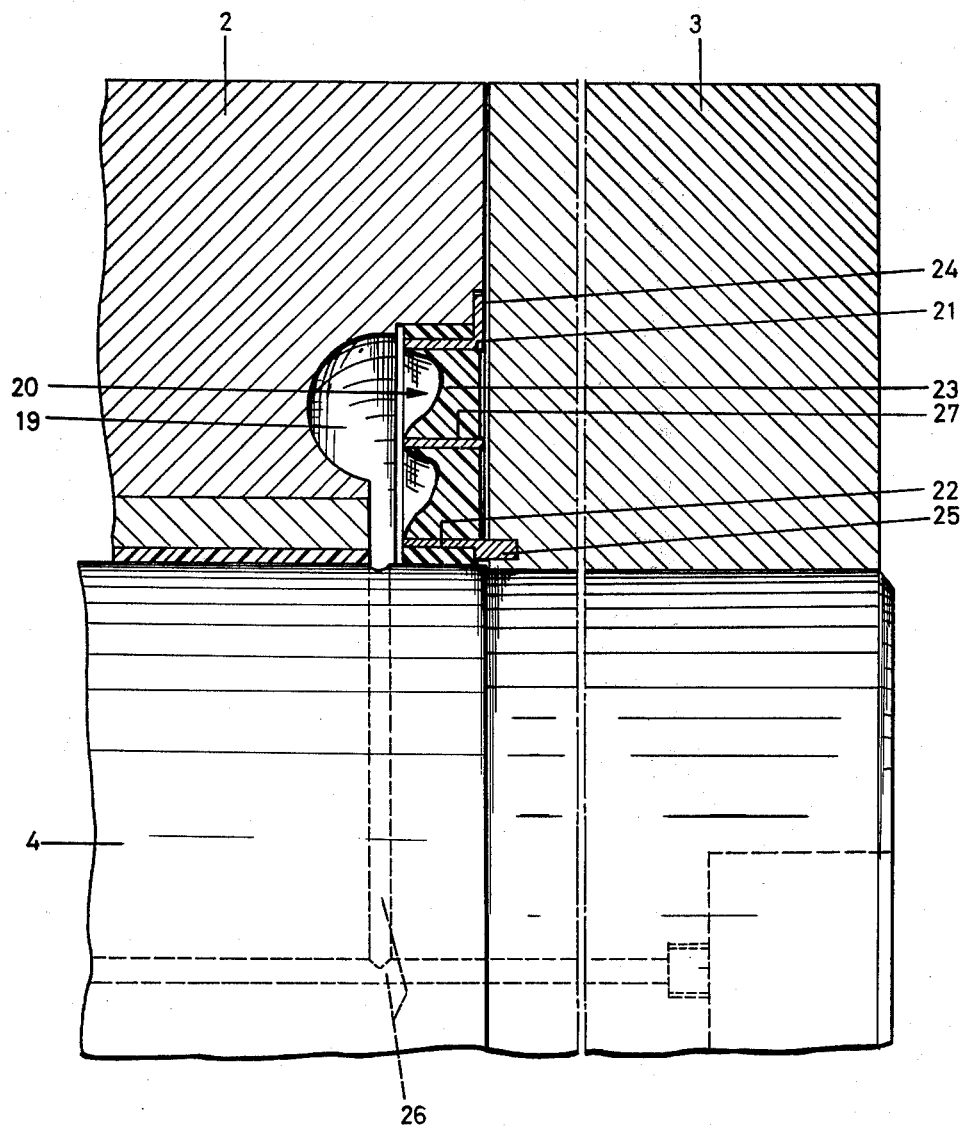

BUCKET DREDGER

The invention relates to a bucket dredger having a bucket chain guided over a rocker, said bucket chain comprising a plurality of buckets pivotally interconnected by pins to form an endless chain, the rocker having the shape of a polygon with sides having a length corresponding to the length of the frame member of the buckets.

It is known from practice that the pivot pins of the bucket chain are exposed to rapid wear, in particular in the case of heavy loads and high bucket speeds which occur in bucket dredgers adapted for operating at considerable depths.

The object of the invention is therefore to provide means to reduce the wear of the pins.

It has been found that at a predetermined surface pressure the wear and tear of the pins increase considerably more than proportionally with the increase of the friction speed.

The invention aims at reducing the friction speed in that according to the invention the buckets are interconnected by links situated between each two buckets, said links being pivotally connected to the buckets by means of pins and having a length which is substantially shorter than the length of the frame member of the buckets, the polygonal sides of the rocker having alternatingly a length corresponding to the length of the frame member of the buckets and to the length of the links arranged between the buckets.

In this way, when the bucket chain is guided around the rocker, the angular displacement around the pins and consequently the angular velocity and friction speed are considerably reduced.

It is to be noted that the angular displacement and consequently the friction speed may also be reduced by a rocker having more sides than the usual number, for example 12 sides instead of 7. However, such a rocker is difficult to mount on account of its size and weight and the greater driving torque requires a heavier drive means.

Since the links are now very short, the pivot pins can be fixed in a simple and quickly replaceable manner and for this purpose according to the invention each link comprises an elongated opening with rounded ends in which a pressure member is accommodated pressing the end portions of the pivot pins projecting through said opening against the ends of said opening.

It is preferred that the pressure member comprises a spindle partly threaded from the one end, the threaded part of said spindle being in engagement with the internal thread formed in the cavity of a first sleeve fitting in a recess in the peripheral surface of one of the pins and said spindle being situated with its non-threaded other end part in the cavity of a second sleeve open at one end and fitting in a recess in the peripheral surface of the other pin, the spindle being provided with engaging means for rotating the spindle to press the sleeves apart against the pins so as to press the pins against the rounded sides of the longitudinal opening in the link.

In connection with the small angular displacement occurring in the bucket chain according to the invention it is possible, moreover to use lubricating means with a non-slipping lubricant seal. For this purpose according to the invention each bucket comprises lubricant chambers communicating with lubricating channels extending through the pivot pin and each being formed by an annular recess around a pivot pin in the outside of the frame member of the bucket, and recess being open towards the pivot pin and the link, there being provided in said recess a sealing ring consisting of two concentric rings which are embedded in an annular body of an elastic material, near the inner and outer circumference of said body respectively, said body abutting with its outer circumference against the radial end face of the recess and with its inner circumference against the pivot pin so that said open sides of the recess are sealed by the sealing ring while leaving the lubricant chamber open, the outer ring of the sealing ring comprising a projecting part at the outer side bent over 90° outwardly which abuts against a sunken peripheral part of the recess and the inner ring being connected to the link.

The invention will now be further explained with reference to the accompanying drawings in which:

FIG. 2 presents a section according to the line II—II in FIG. 3.

FIG. 3 shows in longitudinal section and on an enlarged scale the way in which the pivot pins are held in a link according to the invention.

FIG. 4 shows in section and on an enlarged scale the lubricating means provided according to the invention.

Figure 1:
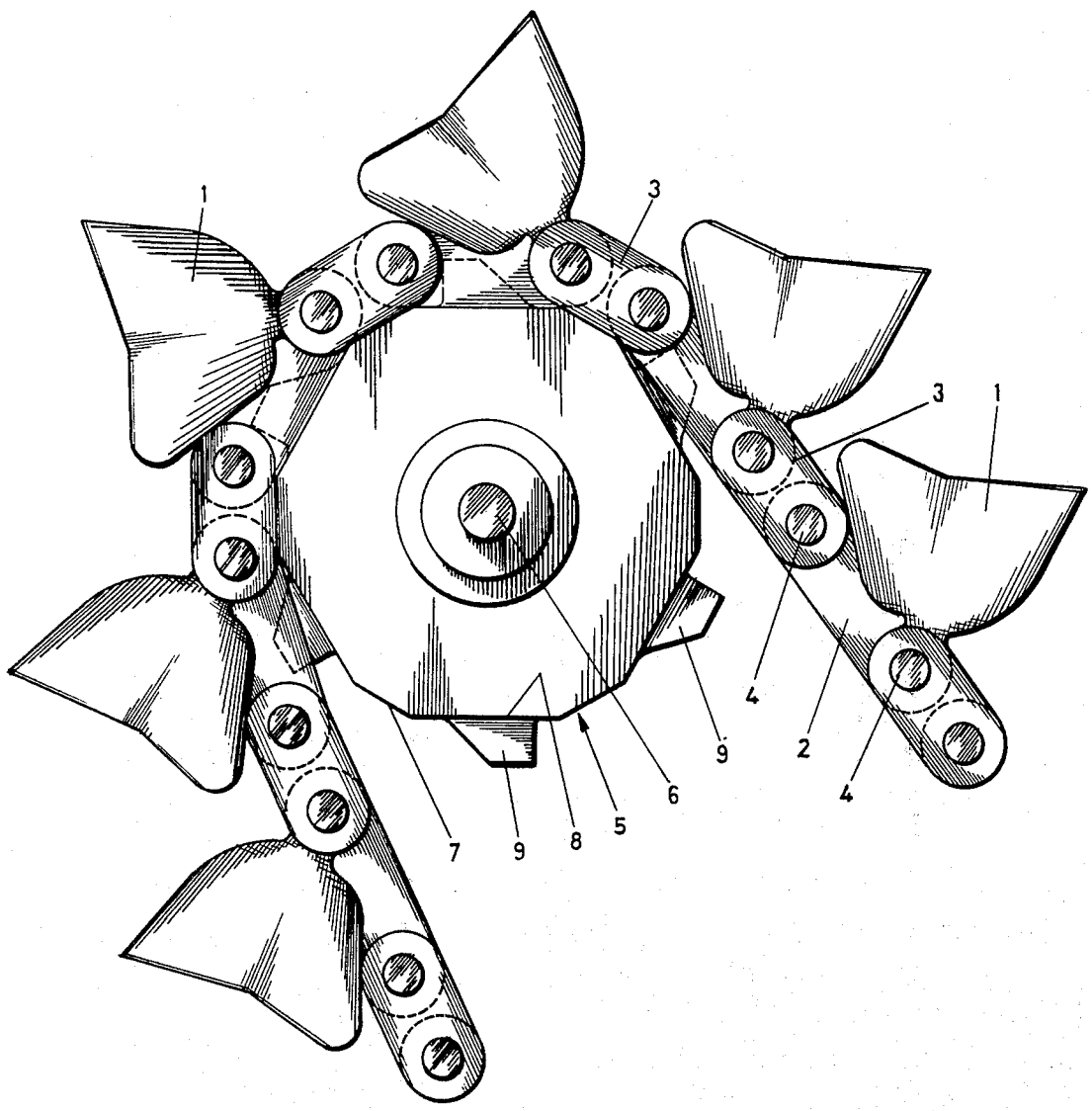
FIG. 1 shows in elevational view the rocker and a part of the bucket chain according to the invention.

FIG. 1 shows part of a bucket chain according to the invention, comprising the buckets 1 connected to a frame member 2 and the links 3 pivotally connected by means of pins 4 to the frame members of the buckets 1. The rocker 5 which is adapted to rotate about the shaft 6 has the shape of a polygon with alternating sides 7 and 8 having a length corresponding to the links 3 and a length corresponding to the frame members 2 of the buckets 1 respectively. Furthermore the rocker is provided with the jaws 9 for dragging the bucket chain.

In FIGS. 2 and 3 it is shown in which way the pins 4 are held in the links 3. Each link 3 comprises an elongated opening 10 with rounded ends, there being accommodated in said opening a pressure member comprising a spindle 11 of which the threaded portion is in engagement with the inner thread of the sleeve 12 and of which the non-threaded other end portion projects into the hollow interior of a second sleeve 13 open at one side. The sleeves 12 and 13 fit in recesses 14 and 15 respectively, said recesses being formed in the pins 4. The spindle 11 furthermore comprises engaging means 16 for rotating the spindle, and between the front face of the spindle disposed in the sleeve 13 and the axial end face of the hollow interior of the sleeve 13 a Belleville washer 17 is provided. The opening 10 in the link 3 is provided at the side of the bucket frame member 2 with a shoulder 18 by which the pins 4 are also fixed in axial direction.

FIG. 4 shows the arrangement for providing lubrication according to the invention. The frame member 2 of each bucket 1 comprises a recess 19 extending about the pivot pin 4, said recess being closed by a sealing ring 20. The sealing ring 20 consists of two concentric rings 21 and 22 embedded in an annular body of an elastic material 23. The ring 21 comprises a portion 24 bent over an angle of 90°, said portion being accommodated in a countersunk peripheral part of the recess 19, while the ring 22 comprises a projecting part 25 fitting in a recess in the link 3. In this way the sealing ring 20 seals a lubricant chamber in the recess 19 which communicates with the lubricating channels 26 in pin 4. In the sealing ring 20 a reinforcing ring 27 is embedded.

I claim:

1. A bucket dredger having a bucket chain guided over a rocker, said bucket chain comprising a plurality of buckets pivotally interconnected by pins to form an endless chain, the rocker having the shape of a polygon with sides having a length corresponding to the length of the frame members of the buckets, the buckets being interconnected by links arranged between each two buckets, said links being pivotally connected to the buckets by means of said pins and having a length which is substantially shorter than the length of the frame member of the buckets, the polygonal sides of the rocker having alternately a length corresponding to the length of the frame members of the buckets and to the length of the links situated between the buckets, each link comprising an elongated opening with rounded ends in which a pressure member is accommodated pressing the end portions of two pivot pins projecting through said opening against opposite ends of said opening.

2. A bucket dredger according to claim 1, characterized in that the pressure member comprises a spindle partly threaded from the one end, the threaded part of said spindle being in threaded engagement with an internal thread in the hollow interior of a first sleeve fitting in a recess in the peripheral surface of one of the pins and said spindle being disposed with its non-threaded other end part in the cavity of a second sleeve open at one end and fitting in a recess in the peripheral surface of the other pin, the spindle being provided with engaging means for rotating the spindle to press the sleeves apart against the pins so as to press the pins against the rounded ends of the longitudinal opening in the link.

3. A bucket dredger having a bucket chain guided over a rocker, said bucket chain comprising a plurality of buckets pivotally interconnected by pins to form an endless chain, the rocker having the shape of the polygon with sides having a length corresponding to the length of the frame members of the buckets, the buckets being interconnected by links arranged between each two buckets, said links being pivotally connected to the buckets by means of said pins and having a length which is substantially shorter than the length of the frame member of the buckets, the polygonal sides of the rocker having alternately a length corresponding to the length of the frame members of the buckets and to the length of the links situated between the buckets, each bucket comprising lubricant chambers communicating with lubricating channels extending through the pivot pins and each being formed by an annular recess around a pivot pin in the outside of the frame member of the bucket, said recess being open toward the pivot pin and the link, and a sealing ring of elastic material in said recess which is at its outer circumference in non-slipping and sealing relationship connected to the bucket and at its inner circumference in non-slipping and sealing relationship connected to the pin.

* * * * *